(12) United States Patent
Mehta

(10) Patent No.: US 10,645,191 B1
(45) Date of Patent: May 5, 2020

(54) USER CONTROLLED COMPOSITION OF CONTENT

(71) Applicant: Amazon Technologies, Inc., Seattle, WA (US)

(72) Inventor: Nikhil Mehta, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 427 days.

(21) Appl. No.: 14/860,489

(22) Filed: Sep. 21, 2015

(51) Int. Cl.
*G06F 3/048* (2013.01)
*H04L 29/08* (2006.01)
*H04W 24/08* (2009.01)
*G06F 3/0484* (2013.01)
*G06F 40/14* (2020.01)

(52) U.S. Cl.
CPC ........ *H04L 67/322* (2013.01); *G06F 3/04842* (2013.01); *G06F 3/04847* (2013.01); *G06F 40/14* (2020.01); *H04L 67/02* (2013.01); *H04L 67/10* (2013.01); *H04W 24/08* (2013.01)

(58) Field of Classification Search
CPC ............... H04L 67/322; G06F 3/04842; G06F 3/04847; G06F 3/048
See application file for complete search history.

(56) References Cited

U.S. PATENT DOCUMENTS

| | | | |
|---|---|---|---|
| 6,563,517 B1* | 5/2003 | Bhagwat | G06F 17/30905 375/E7.016 |
| 9,158,526 B1* | 10/2015 | Nguyen | H04L 41/08 |
| 2007/0294333 A1* | 12/2007 | Yang | G06F 17/30899 709/203 |
| 2008/0120538 A1* | 5/2008 | Kurz | G06F 17/30893 715/255 |
| 2009/0210514 A1* | 8/2009 | Davis | G06F 17/30905 709/219 |
| 2014/0173680 A1* | 6/2014 | Gilbert | H04N 21/44004 725/134 |
| 2015/0160808 A1* | 6/2015 | Walkin | G06F 3/0481 715/800 |
| 2015/0277893 A1* | 10/2015 | Kelly | H04L 9/3228 717/169 |
| 2016/0198010 A1* | 7/2016 | Roy | H04L 67/22 709/224 |
| 2016/0358312 A1* | 12/2016 | Kolb, V | G06T 5/003 |

\* cited by examiner

*Primary Examiner* — Mahelet Shiberou

(74) *Attorney, Agent, or Firm* — Kilpatrick Townsend & Stockton LLP

(57) ABSTRACT

Techniques are described for providing a content composing service that utilizes user feedback regarding network connectivity information or desired detail level to enhance content viewing and/or interacting. For example, content may be provided to a computing device in response to a request for content from the computing device. Further, input that indicates a desired detail level for the content may be received. The content may be modified based at least in part on the input and provided to the computing device. In embodiments, the modified content may be in accordance with the desired detail level indicated by the input. A graphical representation of the desired detail level for the content may be provided to the computing device.

17 Claims, 12 Drawing Sheets

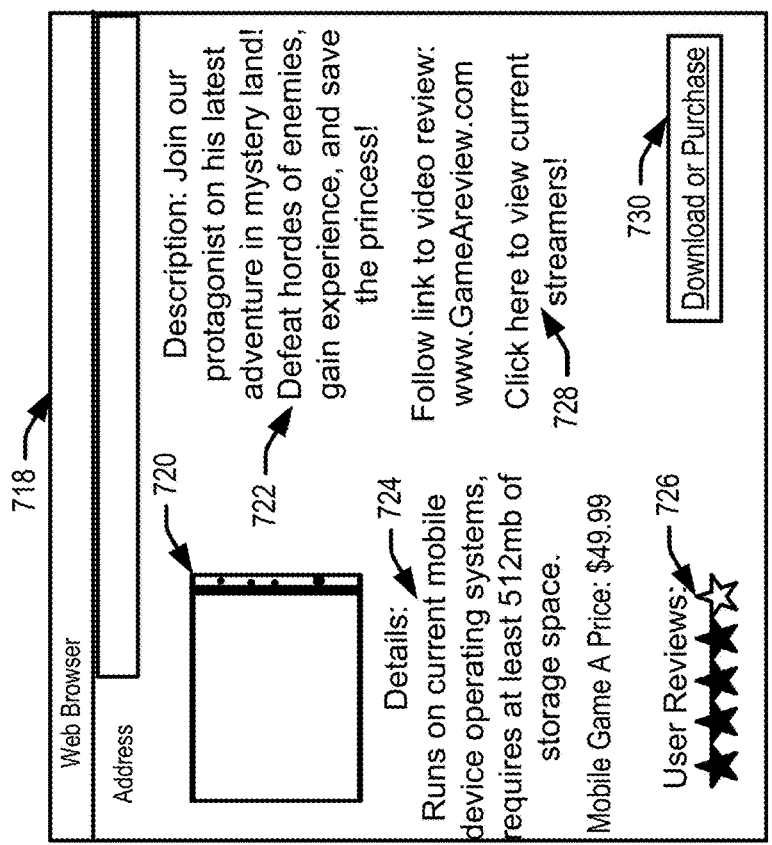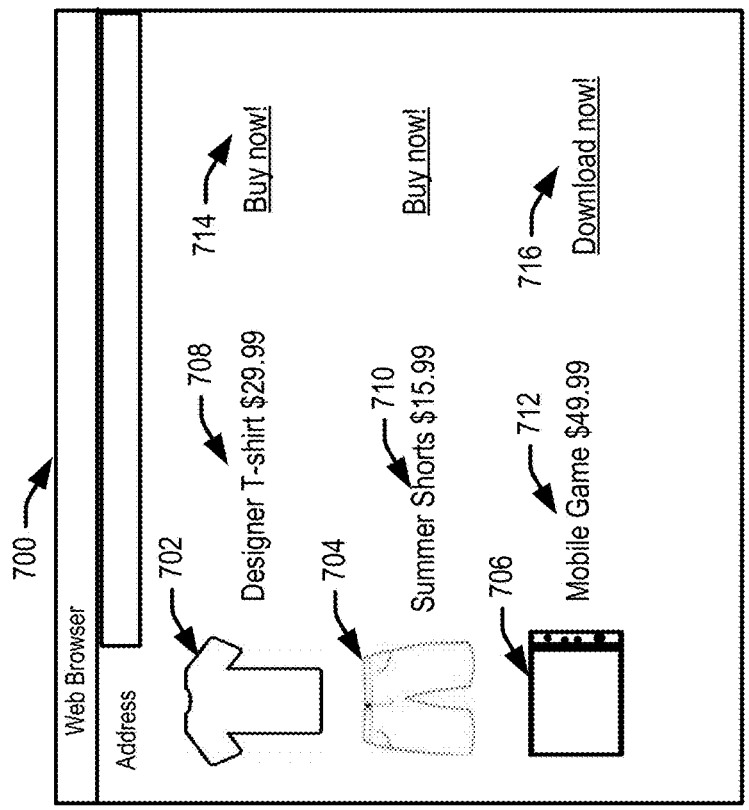
FIG. 7

USER CONTROLLED COMPOSITION OF CONTENT

BACKGROUND

Current network technologies provide a number of beneficial services to users of the Internet and other networks. For example, using the Internet, users are able to search, view, and/or order a number of items from electronic marketplaces. However, as computing devices continue to advance in processing power and mobility data access networks, availability, and infrastructure may lag behind in real world scenarios. Thus, while a user's computing device may be capable of requesting and providing high detailed content poor network availability may result in a poor viewing/interacting experience for the user. Poor viewing/interacting experiences can be frustrating for the user and in the online retailer or information providing environment can result in loss of profits or good will.

BRIEF DESCRIPTION OF THE DRAWINGS

Various embodiments in accordance with the present disclosure will be described with reference to the drawings, in which:

FIG. 7 illustrates some examples of modified content that can be generated and provided by the content composing service, according to embodiments;

DETAILED DESCRIPTION

Figure 1:
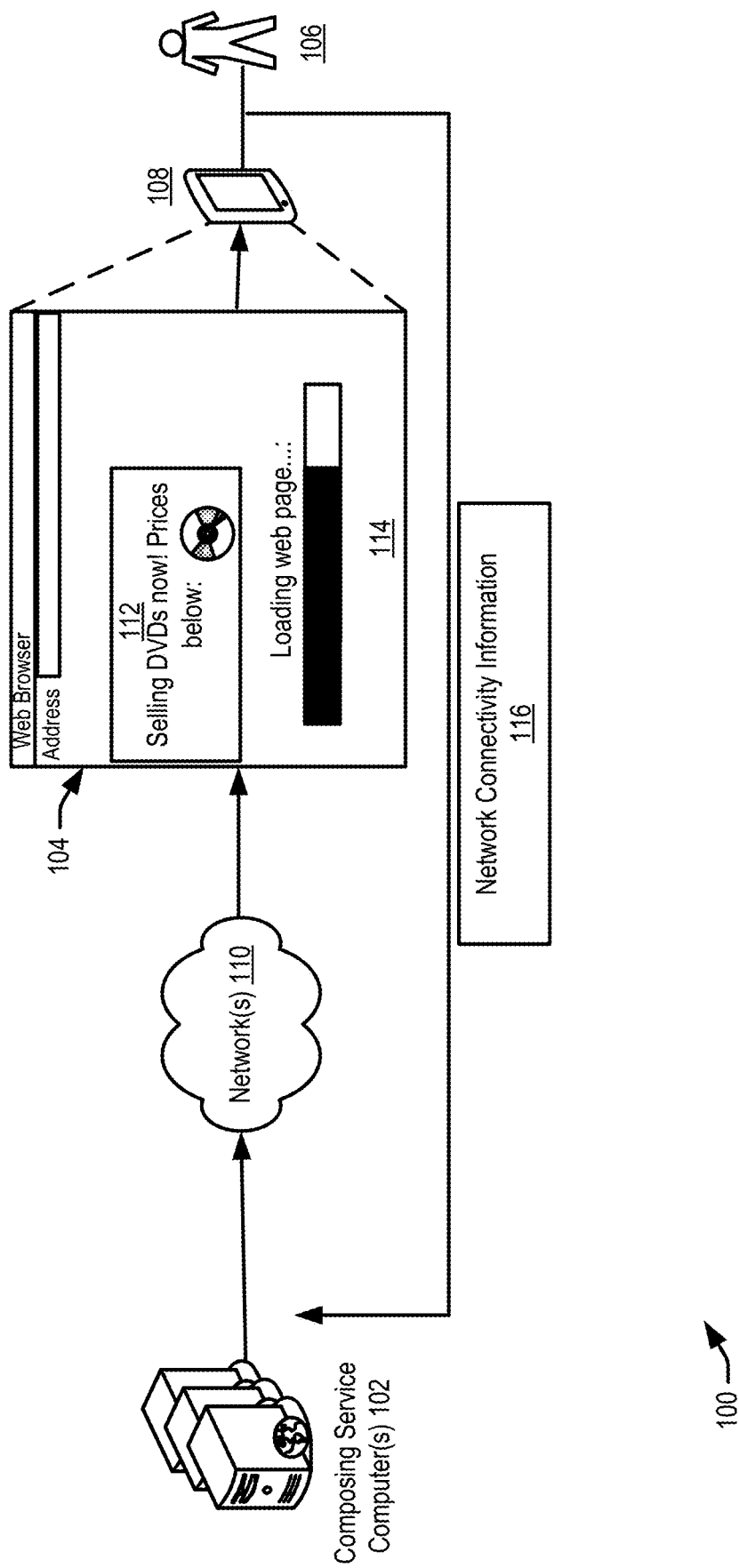
FIG. 1 illustrates an example data flow for a content composing service, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing a content composing service that utilizes user feedback to modify, update, or re-compose content to provide the user with a better viewing/interacting experience given their current network connectivity availability/information. In some examples, the content composing service may maintain information that indicates critical and non-critical elements for a plurality of web pages. In accordance with at least one embodiment, the web page or content may be composed to be presented according to the user feedback that corresponds to the user's network availability or network environment. In embodiments, a web page includes a suitable hypertext document connected to the world wide web that may be presented via a web browser or application that is written in HyperText Markup Language (HTML) or other suitable markup language. In accordance with at least one embodiment, a user may utilize physical components of their computing device, such as the increase/decrease volume buttons, or gestures on a touch screen, to provide feedback on their current network connectivity experience. The network connectivity or change in network connection quality may include or be dependent on changes in connectivity, bandwidth, latency, or any suitable network quality/speed metric associated with networks. The content composing service may utilize the user provided feedback and the information that indicates critical and non-critical elements to modify, update, or re-compose the content and provide it for presentation to the user. The modified content may include more or less information and details according to the feedback and may be configured to be presented in accordance with the user's network connectivity environment to provide an enhanced viewing/interacting experience. In embodiments, dynamic content composition may be provided as the user may continually or periodically provide updated or new network connectivity information to the content composing service that can in turn increase or decrease the level of detail for the content and provide it to the user for viewing/interacting.

In a non-limiting example, a user may be interacting with an online retailers web page via their mobile phone as they commute from home to work. While in their home, they may enjoy the experience of a high quality wireless network. However, upon entering a bus to commute to work the only available network may be a 2G network. While commuting on the bus the user may grow frustrated at the lengthy load times of content provided via the online retailer because of the 2G network connectivity. The user may provide feedback to the content composing service by depressing the volume down button on their mobile phone while interacting with the web page. The user provided feedback regarding their network connectivity information/environment may be utilized by the content composing service to modify the web page to increase the user's viewing and interacting experience. As the user has provided feedback that indicates lower network quality (depressing the volume button down rather than up) the content composing service may modify the web page to include less details or remove non-critical elements thus allowing for faster transmission and loading of content to the user's mobile phone. Thereafter, once the user has reached work and is once again able to connect via a wireless network, the user can utilize the mobile phone to provide feedback to the content composing service indicating that they would like an increased detail level for provided web pages. The content composing service can utilize the updated network connectivity information from the user to modify the web page by including more details including one or more non-critical elements and provide the modified web page for presentation to the user according to the desired detail level.

In accordance with at least one embodiment, the content composing service may maintain a mapping or other information for determining a desired detail level from the user based on the feedback provided by the user. For example, the content composing service may utilize event handling application program interface calls to determine that physical components of a computing device have been interacted with at a given time (a volume button up or down interaction or a touch screen gesture of a mobile phone or tablet computing device). In embodiments, the user may utilize user interface elements provided via the content or an application associated with the content composing service to provide the feedback that indicates the desired detail level or current network connectivity information. In embodiments, a user interface element may be provided via the application associated with the content composing service that enables the user to be directed to a full detailed web page or default web page or piece of content that does not take into account the network availability of the user.

In accordance with at least one embodiment, a graphical representation of the desired detail level may be generated and provided with the content to a computing device of a user. In examples, the graphical representation may be interacted with by the user to provide feedback regarding a desired increase or decrease in detail level for content. The graphical representation of the desired detail level may be provided for presentation via content such as web page or an application that is configured to run on the computing device. In embodiments, the content composing service may generate and provide a notification to the user, via the computing device, that indicates a current detail level and a recommendation to move to another detail level given a change in network connectivity. For example, an application provided by the content composing service may utilize a series of network connectivity pings to available networks to determine the network availability of the user device. A network connection quality test may be conducted by an application associated with a user's computing device by utilizing a conventional Transmission Control Protocol/Internet Protocol (TCP/IP) test.

The network availability update or change may be utilized by the content composing service to generate and provide the notification that enables the user to increase or decrease the desired detail level based on the updated information. In accordance with at least one embodiment, the user may provide feedback indicating their desire to enter a particular data usage mode or interactive mode. For example, a user and associated computing device may be able to utilize a high speed network (such as a home wireless network) but only have a limited amount of data left for their monthly data usage plan. The user may provide feedback to the content composing service that indicates their desire to enter a data plan savings mode that can be utilized by the content composing service to modify content to utilize as little as possible data when providing content. In embodiments, the user may also make a selection of a browse mode versus a shop mode. For example, a browse mode may correlate to a low detail level of content that allows a user to view, browse, and interact with minimal details provided by content providers. A shop mode may include more detailed and critical elements for content provided by online retailers or other entities that allow a user to have access to a plethora of information that aids in making a decision of whether to order an item.

FIG. 1 illustrates an example data flow for a content composing service, according to embodiments. The data flow 100 includes composing service computers 102 providing a web page 104 to a user 106 via a computing device 108. In embodiments, the web page 104 may be provided to the computing device 108 via one or more available networks 110. The web page 104 included in FIG. 1 includes a short description and an image of an item 112 available for purchase and further details about the item 112 that are attempting to load 114. The web page 104 may include several additional elements that are incapable or are slower to load due to the network availability of the user 106 and the computing device 108. As described herein, a user 106 may interact with the computing device 108 to provide network connectivity information 116 to the composing service computers 102. As used herein "network connectivity information" includes user provided feedback regarding their current network availability, potential network connections, utilized connections, or any suitable information associated with the user's desired detail level for provided content from a content provider in accordance with the network environment situation that the user finds themselves in. In the example illustrated in FIG. 1, the network connectivity information 116 provided by the user 106 via the computing device 108 may indicate a desire for a lower level of detail as the web page 104 is attempting to load elements 114 that are taking too long or causing errors because of the network availability of the user 106 and computing device 108.

Figure 2:
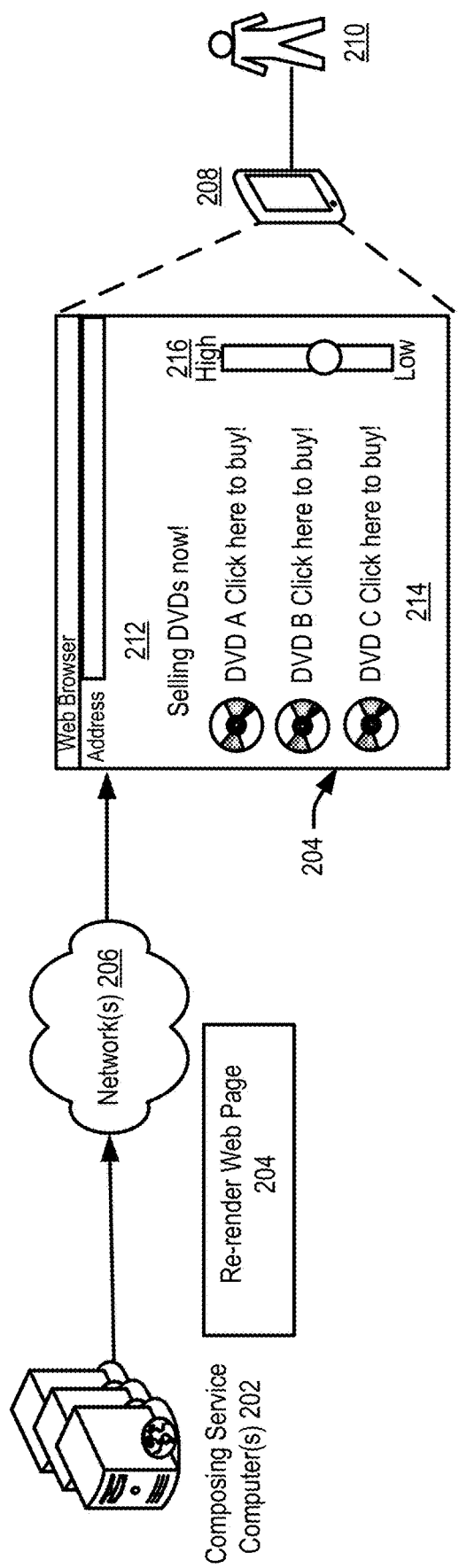
FIG. 2 illustrates an example data flow for a content composing service, according to embodiments.

In accordance with at least one embodiment, the composing service computers 102 may utilize the network connectivity information 116 provided by the user 106 via the computing device 108 to modify, update, change, or recompose the web page 104 for a better viewing/interacting experience. FIG. 2 illustrates the composing service computers 202 providing a re-composed web page 204 via networks 206 for presentation to the computing device 208 and user 210. The re-composed web page 204 includes fewer details 212 about the items 214 from web page 204 (similar to the items 112 from web page 104 of FIG. 1). For example, the details 212 displayed in web page 204 include several images of items available and a button to purchase said item without any other details. The re-composed web page 204 includes a graphical representation 216 of the desired detail level as indicated by the user feedback (network connectivity information 116 from FIG. 1). As described herein, the graphical representation 216 of the desired detail level for the content or web page may be configured to enable the user 210 to update or modify the desired detail level 216 for the content they are viewing or interacting with. In some embodiments, the desired detail level 216 serves as a reminder to notify the user 210 of the current detail level and the user can increase or decrease the desired detail level as their network connectivity environment or situation changes. Thus, the content composing service is able to provide a dynamic viewing/interactive experience for users depending on their current network connectivity information and/or availability that can result in the user being less frustrated and enjoying an enhanced viewing/interacting content session.

Figure 3:
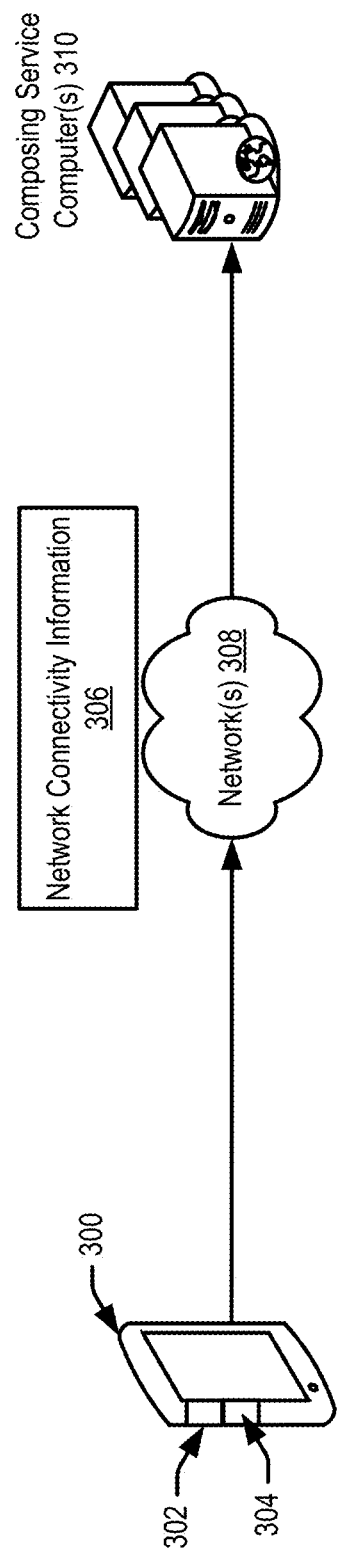
FIG. 3 illustrates an example of user provided feedback regarding network connectivity information for use in a content composing service, according to embodiments.

FIG. 3 illustrates an example of user provided feedback regarding network connectivity information for use in a content composing service, according to embodiments. FIG. 3 includes a mobile computing device 300, such as a mobile phone or tablet computer, with physical components 302 and 304. The physical components 302 and 304 associated with mobile computing device 300 represent a volume up and a volume down button that can be used to provide network connectivity information 306 via one or more networks 308 to composing service computers 310 in embodiments. As described herein, a user may interact with the mobile computing device 300 and physical components 302 and 304 to provide network connectivity information 306 as their network availability and/or environment changes. The composing service computers 310 may utilize the network connectivity information 306 to modify, update, or re-compose content to include more or less details based at least in part on the feedback from the user (network connectivity information 306). The content may be updated dynamically as the user may utilize the physical components 302 and 304 to periodically or continually provide the network connectivity information 306 to the composing service computers 310 to provide an enhanced viewing/interacting experience.

Figure 4:
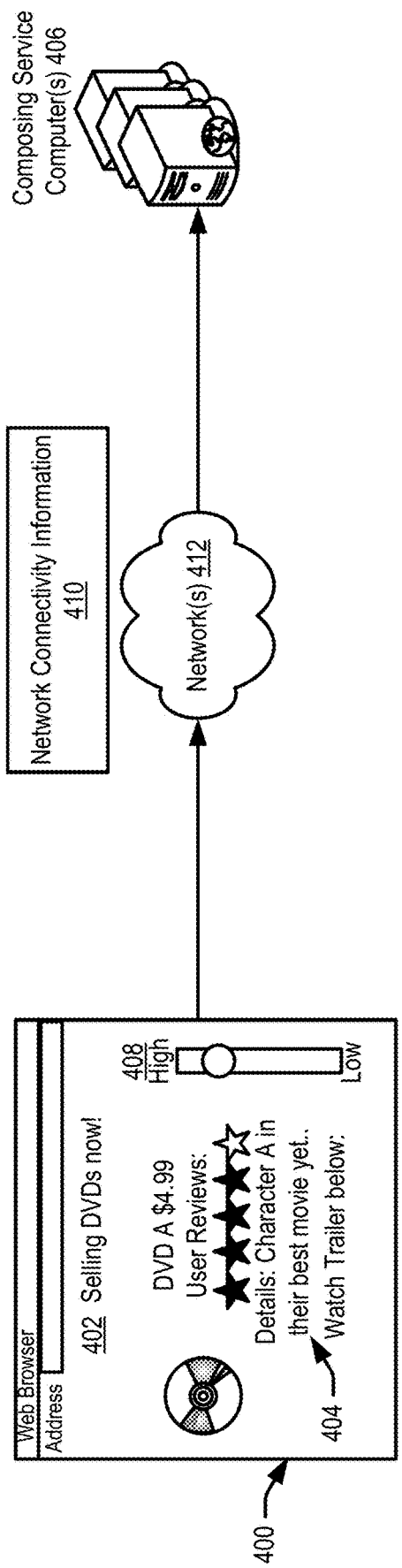
FIG. 4 illustrates an example of user provided feedback regarding network connectivity information for use in a content composing service, according to embodiments.
Figure 5:
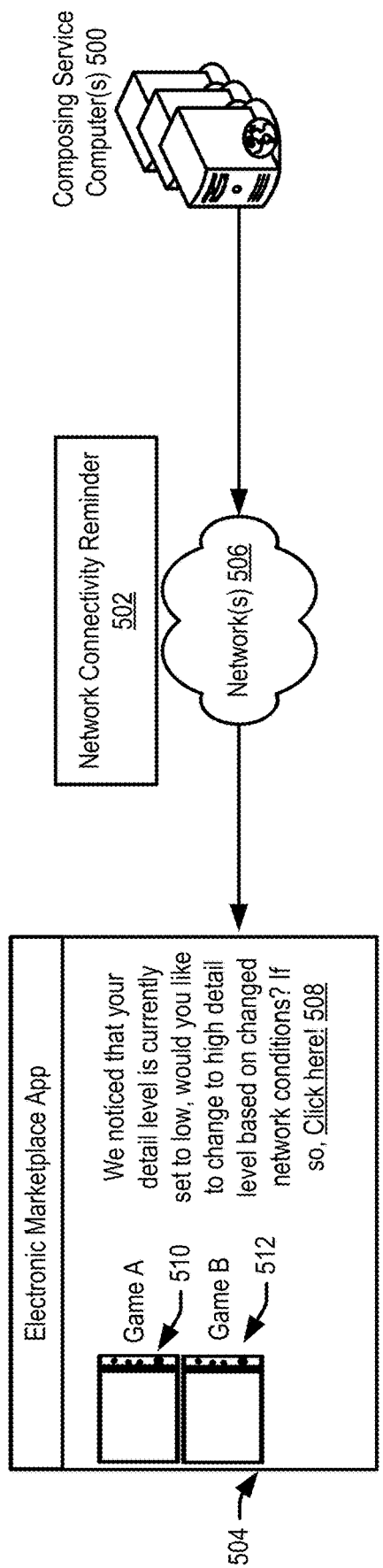
FIG. 5 illustrates an example of user provided feedback regarding network connectivity information for use in a content composing service, according to embodiments.

FIG. 4 illustrates a web page 400 that includes items for sale 402 and detailed information 404 about the items for sale. As described herein, the composing service computers 406 may provide a graphical representation 408 of the current detail level of a web page or content provided to the user. For example, the graphical representation 408 of the detail level for web page 400 indicates a high detail level for the items 402 represented by the detailed information 404 that includes a price of an item, user reviewed, a description of the item, and a link to a trailer for the item. In accordance with at least one embodiment, a user may interact with the graphical representation 408 of the current detail level to modify the desired detail level in response to an update and/or change in network availability. The network connectivity information 410 may be provided to the composing service computers 406 via networks 412 for updating, modifying, or re-composing content that may be provided to a user. FIG. 5 illustrates composing service computers 500 generating and providing a network connectivity reminder 502 to a user via an application interface 504 via networks 506 to a computing device running an application associated with the content composing service. For example, FIG. 5 illustrates an electronic marketplace application that may be associated with the content composing service for providing dynamic detailed content to a user. In accordance with at least one embodiment, the network connectivity reminder 502 may be presented via text 508 that describes a current detail level and enables the user to change their current detail level. The application interface 504 may provide for presentation information about one or more items 510 and 512 offered by the electronic marketplace application.

Figure 6:
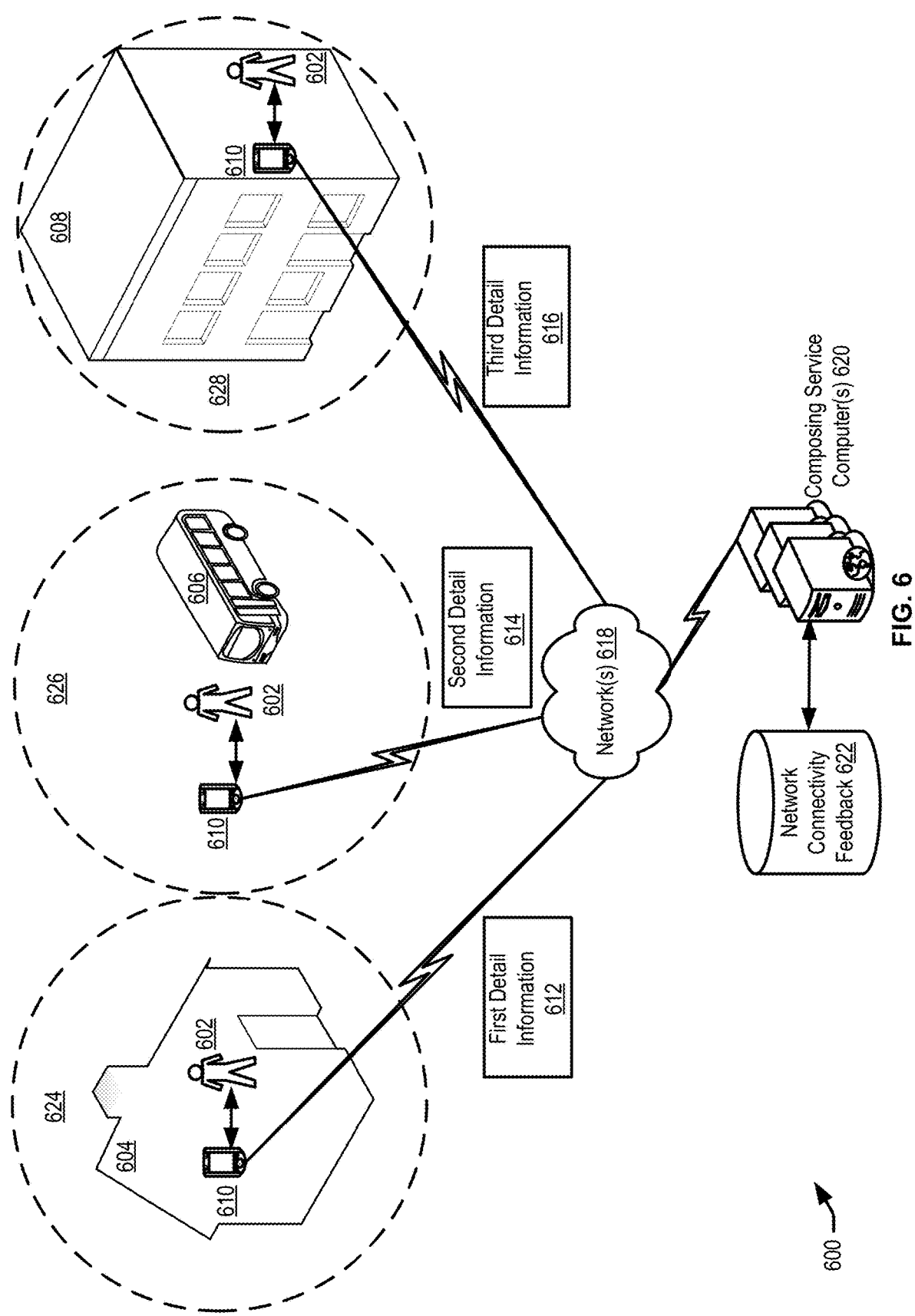
FIG. 6 illustrates an example data flow for a content composing service, according to embodiments.

FIG. 6 illustrates an example data flow for a content composing service, according to embodiments. The data flow 600 of FIG. 6 illustrates features provided by the content composing service by utilizing a travel path of a user 602 moving from home 604, via bus transportation 606, to work 608, to illustrate the changing nature of network conditions/availability that may face an average user. FIG. 6 includes the user 602 interacting with a mobile computing device 610 to provide desired detail information 612, 614, and 616 that corresponds to the user's 602 current network availability/environment as they travel from one location to another. The elements 602 and 610 represent the same user 602 interacting with the same mobile computing device 610 throughout FIG. 6. In embodiments, the detail level information 612, 614, and 616 may be provided via one or more networks 618 to composing service computers 620. The composing service computers 620 may maintain and update received detail level information and/or network connectivity information for a plurality of users that utilize the content composing service in a database such as database 622.

FIG. 6 illustrates several available networks 624, 626, and 628 that the user 602 and mobile computing device 610 may access while moving from location to location (604, 606, and 608). As the user 602 interacts with the mobile computing device in their home 604, which may employ a high speed wireless network 624, the first detail information 612 may indicate a high detail level requested by the user 602 for content from the composing service computers 620. For example, the user 602 may be browsing through several items offered by an online retailer via a web page displayed on the mobile computing device 610. As the user 602 heads to work, they enter a bus 606 and continue to browser for items offered by the online retailer. However, the available network has changed from a high speed wireless network 624 to a low speed cell phone network 626. As a result of the change in network availability/environment, the user 602 may notice lag or long loading times in content presented to the user 602 via the mobile computing device 610. In embodiments, the user 602 may interact with the computing device 610 to provide second detail information 614 that indicates a change in detail level (requesting lower detail level for content) than the first detail information 612.

The request for a change in detail level may represent the user's 602 desire to view content despite their current network conditions or can indicate the user's 602 desire to efficiently utilize their data plan by accessing whatever networks are available as little as possible. As described herein, in response to the composing service computers 620 receiving the second detail information 614, content may be modified, updated, or re-composed according to the desired detail level and provided to the computing device 610 for the viewing/interacting by user 602. FIG. 6 includes the user 602 arriving at work 608 that also employs a high speed wireless network 628 different from the high speed wireless network 624. In response to arriving at work 608, the user 602 may interact with the mobile computing device 610 to provide third detail information 616 indicating a desire to receive more detailed content that reflects the change in network availability/environment (moving from a low speed cell phone network 626 to a high speed wireless network 628).

The composing service computers 620 may utilize the third detail information 616 to modify, update, or re-compose content provided to the user device 610 in accordance with the increased detail level indicated by the third detail information 616. In accordance with at least one embodiment, the composing service computers 620 may generate and provide a notification or reminder that can be provided to the user 602 via the mobile computing device 610. The notification or reminder may be generated in response to information received or obtained by the composing service computers 620 that indicates a change in network availability/environment for the mobile computing device 610. For example, an application provided by the composing service computers 620 may be provided to the mobile computing device 610 that is configured to utilize periodic network ping operations to identify a change in network availability/environment. The information obtained by the application can be provided to the composing service computers 620 and utilized to generate the notification or reminder. Further, the notification or reminder may inform the user of the change in network availability/environment and enable the user to update or change their desired detail level in accordance with the latest network connectivity information. If the user wishes to maintain their desired detail level, the reminder or notification can be ignored or dismissed via the application, mobile computing device 610, or content being provided to the user.

FIG. 7 illustrates some examples of modified content that can be generated and provided by the content composing service, according to embodiments. FIG. 7 includes a web page 700 that represents a browse mode selection by a user for content provided by a content provider. The web page 700 is presented via a web browser and includes several items 702, 704, and 706 with accompanying information 708, 710, and 712 and buy 714 or download options 716. The selection of a browse mode by a user represents input provided by the user that indicates a lower level of detail for provided content that allows the user to view critical elements of associated content. Content provided according to a browse mode selection may include minimal details and utilize less data when being transmitted over a network. As such, the web page 700 that represents the browse mode of content provided by an electronic marketplace includes a small image of an item 702, a short description and price 708, and a buy 714 or download option 716 depending on the item that allows the user to casually browse for items while operating in poor network availability conditions or attempting to save data for a data usage plan.

FIG. 7 illustrates a different web page, web page 718 that represents a shop mode selection by a user for content provided by a content provider. The web page 718 is presented via a web browser and includes an item 720 with various details about the item 720 including a description 722, details about the item 724, user reviews about the item 726, videos or video streams related to the item 728, and a download or purchase option button 730. The web page 718 includes more details (722-730) about one item 720 than the web page 700 that includes minimal details (708-716) for three different items (702-706). The difference in information provided represents the increased capability of networks available to a viewer of web page 718 as compared to web page 700. Additionally, the time required to properly identify and analyze the information presented in web page 718 (shop mode) is greater than the information provided in web page 700 (browse mode).

In accordance with at least one embodiment, the detail level of web page 718 (shop mode) would be greater and utilize more data during transmission over one or more networks than the web page 700 (browse mode). In embodiments, the browse mode selection may be selected to save data while the shopping mode may be selected for users that are not limited by data usage. In accordance with at least one embodiment, the content composing service may maintain and identify the selection of browse mode or shopping modes by users who participate in, utilize, or are associated with the service. In accordance with at least one embodiment, the content composing service may utilize the maintained information about critical and non-critical elements for a plurality of web pages to modify, update, or re-compose content in accordance with the selection of browse mode or shop mode.

Figure 8:
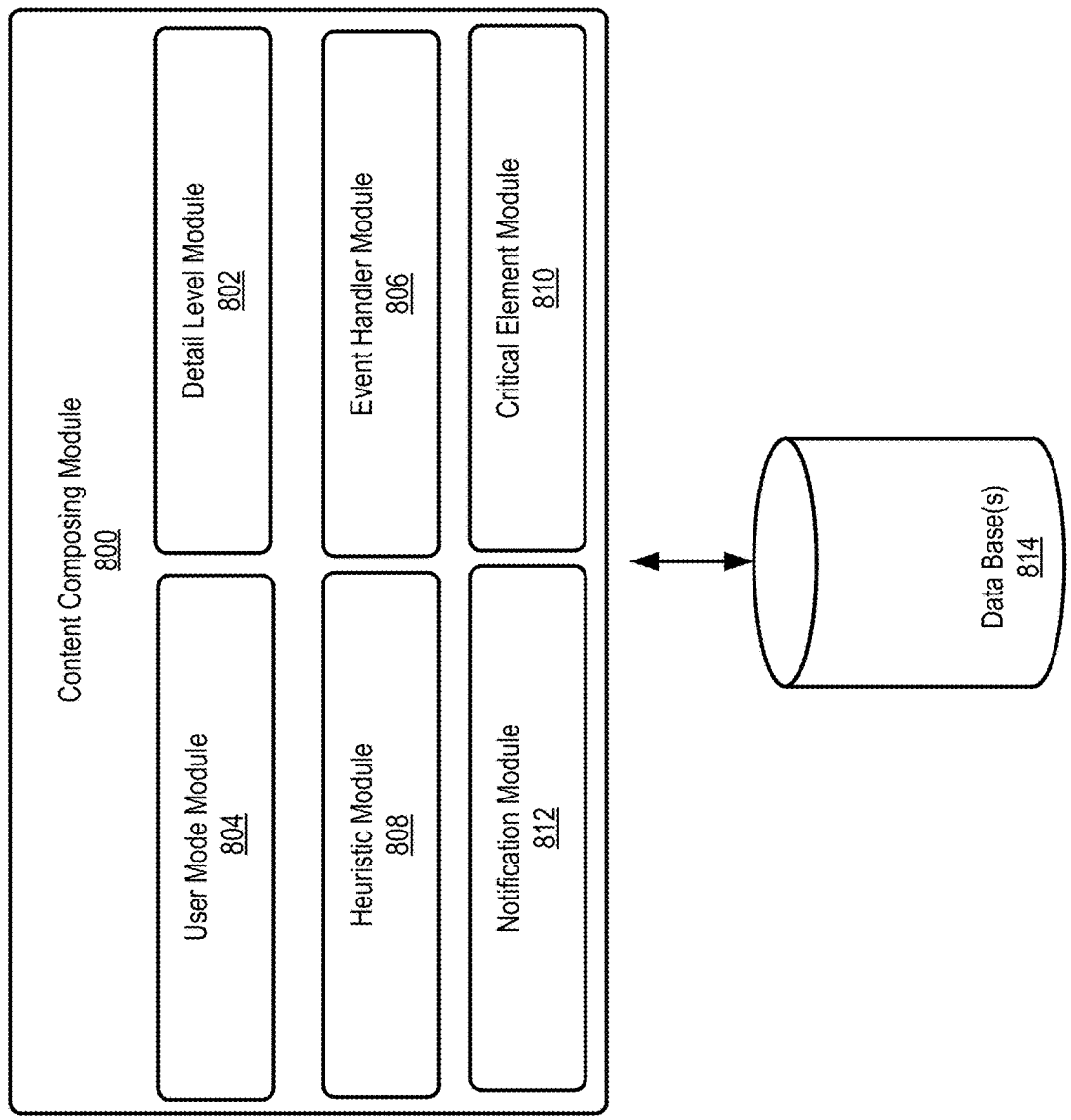
FIG. 8 illustrates an example content composing module, according to embodiments.

FIG. 8 illustrates an example content composing module, according to embodiments. In accordance with at least one embodiment, the content composing module 800 may include a detail level module 802, a user mode module 804, an event handler module 806, a heuristic module 808, a critical element module 810, and a notification module 812 in communication with a database 814. The modules included within and including the content composing module 800 may be software modules, hardware modules or a suitable combination thereof. If the modules are software modules, the modules can be embodied on a non-transitory computer readable medium and processed by a processor in any of the computer systems described herein. It should be noted that the described processes and architectures described herein can be performed either in real-time or in an asynchronous mode prior to any user interaction. The modules may be configured in the manner suggested in FIG. 8 or may exist as separate modules.

In accordance with at least one embodiment, the content composing module 800 may be configured to generate and provide a graphical representation of a detail level for content provided to a user. The graphical representation of the detail level may represent the requested detail level from a user based at least in part on network connectivity information, network availability, or current network environments. In accordance with at least one embodiment, the graphical representation of detail level may be utilized to provide feedback, by the user, of a requested detail level in response to a change or update in network connectivity. In embodiments, the graphical representation of the detail level may be configured to slowly update to either a higher or lower quality in anticipation of changing network availability. A user may specify the gradual movement of the graphical representation of detail level in a user preference interface provided by the content composing service.

In accordance with at least one embodiment, the detail level module 802 may be configured to maintain a mapping or other identifying information for determining a requested detail level from network connectivity information provided by a user via a computing device. For example, the detail level module 802 may maintain and update a mapping of physical component or gesture interactions to increase/decrease detail level requested by a user. The detail level module 802 may interact with the event handler module 806 to identify the requested detail level from a user utilizing a computing device. In accordance with at least one embodiment, the detail level module 802 may be configured to receive information from a computing device when providing content that identifies how quickly the content is provided and loaded to determine an ideal detail level on behalf of the user. In embodiments where the detail level is identified by the detail level module 802 using metrics associated with loading content that is provided to a computing device of a user, a comparison of the metrics to one or more thresholds may be utilized to determine the appropriate detail level. In an embodiment, the detail level module 802 and notification module 812 may generate and provide a notification to the computing device that enables the user to authorize or confirm the determined detail level on their behalf.

In accordance with at least one embodiment, the user mode module 804 may be configured to identify the selection of a browse mode or shop mode from a computing device from input provided by a user. In an embodiment, the user mode module 804 may be configured to generate and provide a user interface element that is configured to be presented to a user via a computing device that enables the user to select one mode or another mode at their leisure. The user mode module 804 may be configured to maintain and update a log of mode selections by a user for use by the heuristic module 808. The user mode module 804 may interact with the critical element module 810 to determine specific elements and information to provide when providing content with respect to one mode versus the other mode. In accordance with at least one embodiment, the event handler module 806 may be configured to identify events and map the events to a requested detail level from user feedback/input as described herein. In embodiments, the event handler module 806 may be configured to obtain application program interface (API) calls for various input provided by a user interacting with a computing device, a user interface presented on the computing device, or an application presented on the computing device.

In accordance with at least one embodiment, the event handler module 806 may be configured to maintain and update events that corresponds to physical component interaction via the computing device, UI element interaction via a web browser, or UI element interaction via an application, to desired detail level on behalf of the user. In accordance with at least one embodiment, the heuristic module 808 may be configured to identify trends in selections of modes or detail levels on behalf of users by observing and capturing said selections or input over a period of time or history of desired detail levels for content. The heuristic module 808 may maintain the history of desired detail levels for content for each user of a plurality of users utilizing the content composing service described herein. The heuristic module 808 may utilize a machine learning algorithm or other appropriate algorithm for identifying user selection trends with respect to time or for identifying trends from the history of selected desired detail levels for content. In accordance with at least one embodiment, the heuristic module 808 may be configured to determine a user selection of browse mode or shop mode, or a desired detail level based on the determined trend information described herein. In embodiments, the heuristic module 808 may identify previous detail level settings associated with a user's historic detail level selection, or select a most common detail level setting from the user's history detail level selection. The heuristic module 808 may interact with the notification module 812 to provide a notification to a user informing them of the determined detail level or user mode and enabling the user to authorize or verify the automatic determination on their behalf. A user's acceptance or declining of the determined user mode or detail level can also be a data point utilized by the heuristic module 808 to further modify determined trends.

In accordance with at least one embodiment, the critical element module 810 may be configured to maintain critical and non-critical elements for a plurality of web pages or pieces of content authored by content providers. In embodiments, an administrator associated with the content composing service may specify the critical versus non-critical elements or portions. In accordance with at least one embodiment, an author or entity associated with the content provider may specify the critical and non-critical elements or portions. In embodiments, a user may interact with a user interface provided by the content composing module 800 to select or specify critical and non-critical elements, portions, media types, etc., for different content providers. In embodiments, a critical element includes an element that would render the web page or piece of content unfit for its original purpose if it were removed and/or missing when provided for presentation. Non-critical elements may include any suitable element that is not a critical element for the web page or piece of content. In accordance with at least one embodiment, the notification module 812 may be configured to generate and provide a notification or reminder that enables a user to confirm their current detail level or user mode, or change their current detail level or user mode as determined by the heuristic module 808, or the user module 804 as described herein. The notification or reminder may be configured to be presented via the computing device and web browser or application provided on the computing device of a user.

Figure 9:
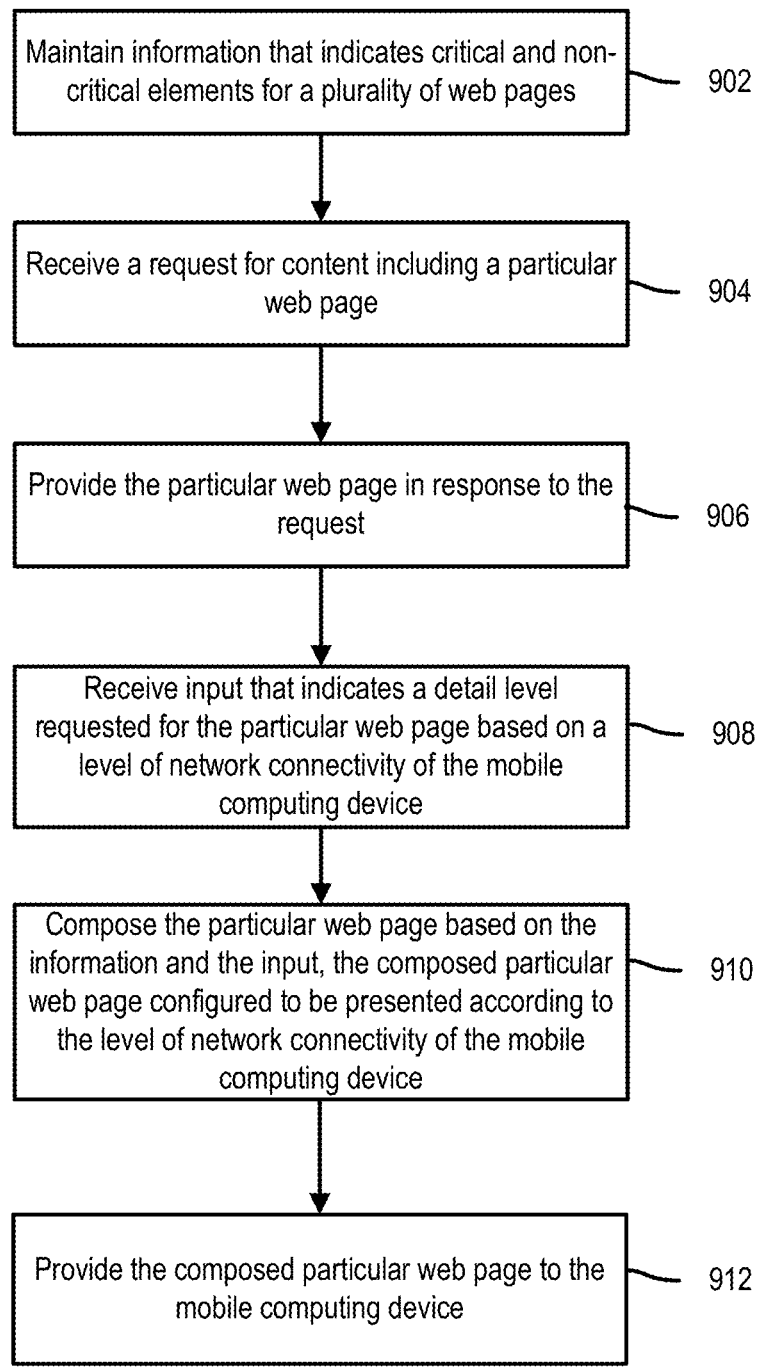
FIG. 9 illustrates an example flow diagram for a content composing service, according to embodiments.
Figure 10:
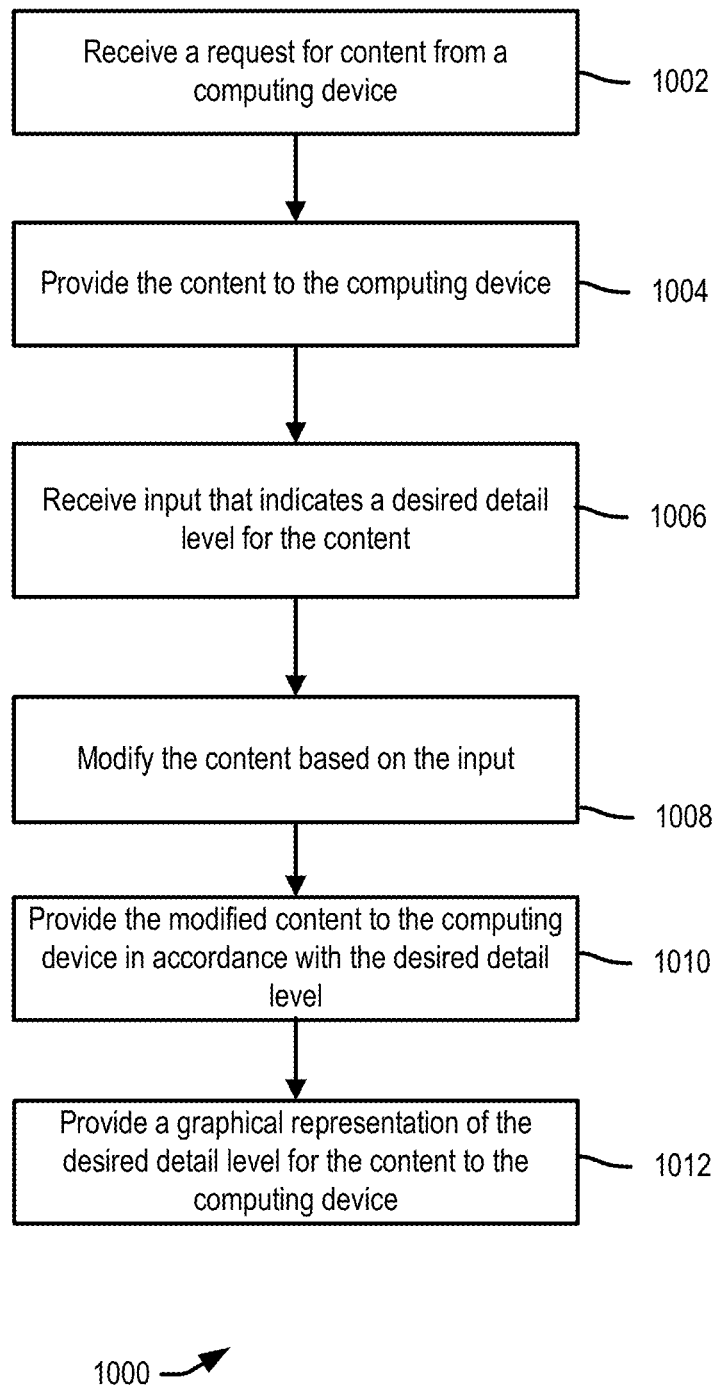
FIG. 10 illustrates an example flow diagram for a content composing service, according to embodiments.

FIGS. 9 and 10 illustrate example flow diagrams for a content composing service, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted below, the code may be stored on a computer-readable storage medium, for example, in the form of a computer program including a plurality of instructions executable by one or more processors. The computer-readable storage medium may be non-transitory.

In some examples, one or more content composing service computers (e.g., utilizing at least one of a content composing module 800, a detail level module 802, a user mode module 804, an event handler module 806, a heuristic module 808, a critical element module 810, and a notification module 812 in communication with one or more data stores 814) shown in FIG. 8 may perform the processes 900 and 1000 of FIGS. 9 and 10. In FIG. 9, the process 900 may include maintaining information that indicates critical and non-critical elements for a plurality of web pages at 902. As described herein, content providers or users may specify the critical and non-critical elements, portions, or media types associated with a plurality of web pages. The process 900 may include receiving a request for content including a particular web page at 904. The request for content may be provided by a computing device that a user is utilizing.

The process 900 may include providing the particular web page in response to the request for content at 906. The process 900 may include receiving input that indicates a detail level requested for the particular web page based on a level of network connectivity of the mobile computing device at 908. In accordance with at least one embodiment, the input may be provided in response to a user interact with physical components of a computing device such as volume buttons, brightness level buttons, or gestures capable of being communicated from the computing device to the content composing service computers. The process 900 may include rendering the particular web page based on the information and the input, the composed particular web page configured to be presented according to the level of network connectivity of the mobile computing device. In embodiments, the input may correspond to a selection of a user mode (browsing versus shopping) or a data usage plan (data savings mode) and the composed web page may utilize the input and information to provide a more detailed or less detailed web page to the computing device of the user. The process 900 may conclude at 912 by providing the composed particular web page to the mobile computing device. In embodiments, content may be updated and/or composed for presentation via an application configured to run on the computing device of a user.

In accordance with at least one embodiment, the process 1000 may include receiving a request for content from a computing device at 1002. The process 1000 may include providing the content to the computing device at 1004. The content may be provided according to a default detail level maintained by the content composing service or the content may be provided according to the last known detail level provided by the particular user and maintained by the content composing service. The process 1000 may include receiving input that indicates a desired detail level for the content at 1006. In accordance with at least one embodiment, the input or selection of a desired detail level may be identified by the content composing service utilizing heuristics or learned patterns from historical input provided by a particular user. The process 1000 may include modifying the content based on the input at 1008, and providing the modified content to the computing device in accordance with the desired detail level at 1010. The process 1000 may conclude at 1012 by providing a graphical representation of the desired detail level for the content to the computing device. As described herein, the graphical representation of the desired detail level may serve an informational purpose by notifying the user of the current detail level for the content but may be interacted with by a user to provide further feedback and modify the desired detail level and in turn the provided content.

Figure 11:
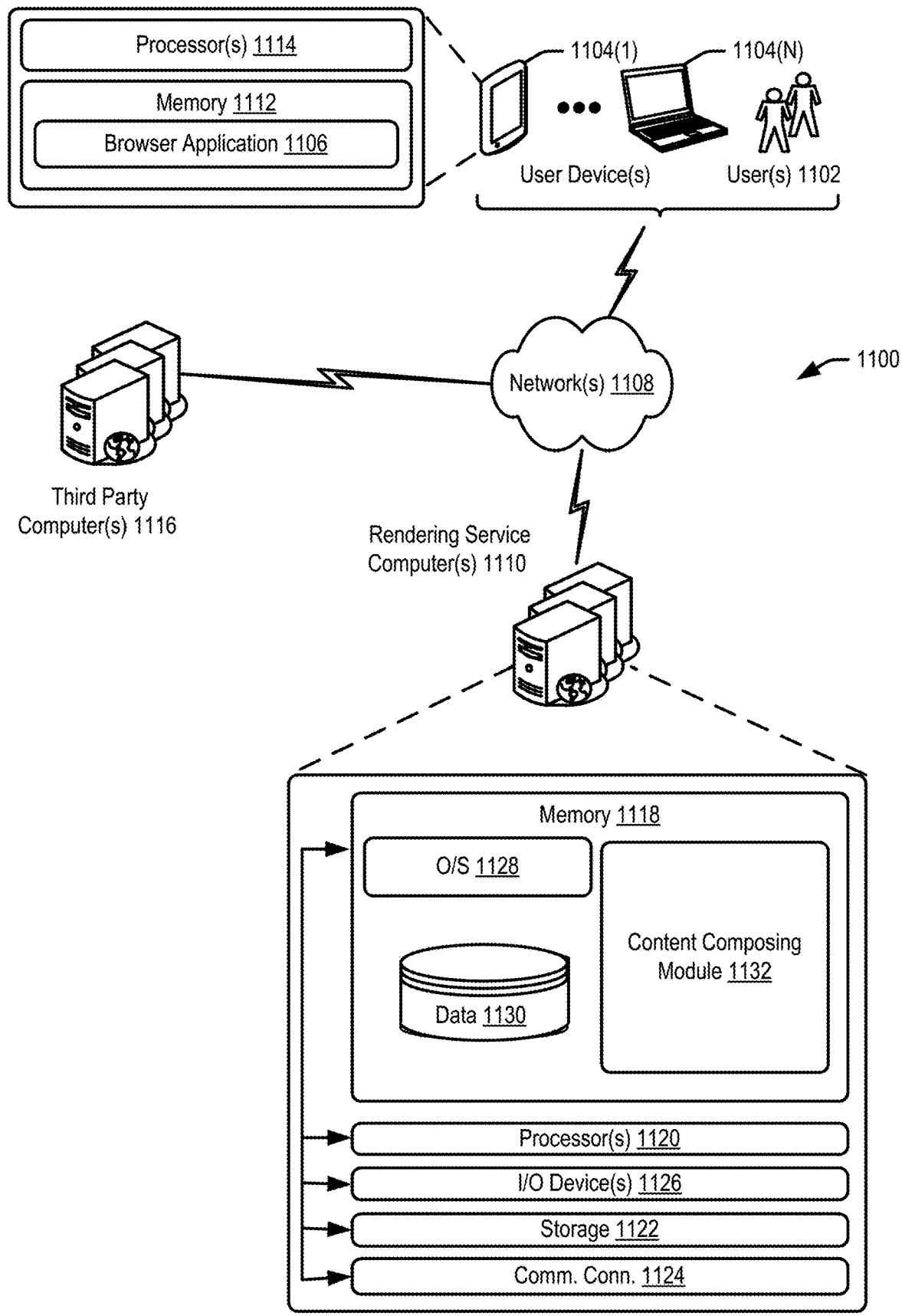
FIG. 11 illustrates an example computer architecture for implementing a content composing service, according to embodiments.

FIG. 11 illustrates an example computer architecture for implementing a content composing service, according to embodiments. In architecture 1100, one or more users 1102 (e.g., users) may utilize user computing devices 1104(1)-(N) (collectively, user devices 1104) to access a browser application 1106 (e.g., a network document browser) or a user interface (UI) accessible through the browser application 1106, via one or more networks 1108 to provide network connectivity information and view and/or interact with modified/re-composed content in accordance with a desired detail level that corresponds to the network connectivity information. The "browser application" 1106 can be any browser control or native application that can access and display a web page or other information. In some aspects, the browser application 1106 may be utilized to select a particular user mode, desired detail level, or data usage plan for modifying presented content in accordance with current network capabilities. In embodiments, the user computing devices 1104 may be interacted with, or components thereof (button presses or user gestures), to provide user feedback regarding network connectivity information and/or desired detail level as described herein.

The architecture 1100 may also include, one or more composing service computers 1110 that may, in some examples, provide computing resources such as, but not limited to, client entities, low latency data storage, durable data storage, data access, management, virtualization, hosted computing environment or "cloud-based" solutions, electronic content performance management, etc. The one or more composing service computers 1110 may also be operable to provide site hosting, computer application development, and/or implementation platforms, combinations of the foregoing, or the like to the one or more users 1102.

In one illustrative configuration, the user computing devices 1104 may include at least one memory 1112 and one or more processing units or processor(s) 1114. The processor(s) 1114 may be implemented as appropriate in hardware, computer-executable instructions, firmware, or combinations thereof. Computer-executable instruction or firmware implementations of the processor(s) 1114 may include computer-executable or machine-executable instructions written in any suitable programming language to perform the various functions described herein. The user devices 1104 may also include geo-location devices (e.g., a global positioning system (GPS) device or the like) for providing and/or recording geographic location information associated with the user devices 1104. The memory 1112 may store program instructions that are loadable and executable on the processor(s) 1114, as well as data generated during the execution of these programs. Depending on the configuration and type of user device 1104, the memory 1112 may be volatile (such as random access memory (RAM)) and/or non-volatile (such as read-only memory (ROM), flash memory, etc.). The user device 1104 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 1112 may include multiple different types of memory, such as static random access memory (SRAM), dynamic random access memory (DRAM), or ROM.

Turning to the components of the memory 1112 in more detail, the memory 1112 may include an operating system and one or more application programs or services for implementing the features disclosed herein including providing location information, receiving and utilizing masking information, and displaying offers, coupons, or advertisements from retailers or particular locations. Additionally, the memory 1112 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 1102 provided response to a security question or a geographic location obtained by the user device 1104.

In some examples, the networks 1108 may include any one or a combination of many different types of networks, such as cable networks, the Internet, wireless networks, cellular networks and other private and/or public networks. While the illustrated example represents the users 1102 communicating with composing service computers 1110 over the networks 1108, the described techniques may equally apply in instances where the users 1102 interact with the one or more composing service computers 1110 via the one or more user devices 1104 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The browser application 1106 may be capable of handling requests from many users 1102 and serving, in response, various user interfaces that can be composed at the user devices 1104 such as, but not limited to, a network site or web page. The browser application 1106 can interact with any type of network site that supports user interaction, including social networking sites, electronic retailers, informational sites, blog sites, search engine sites, news and entertainment sites, electronic marketplaces, and so forth. The described techniques can similarly be implemented outside of the browser application 1106, such as with other applications running on the user device 1104. In some examples, the one or more composing service computers 1110 may communicate with one or more third party computers 1116 to provide desired detail level, network connectivity information or the like to third party content providers.

The one or more composing service computers 1110 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more composing service computers 1110 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more composing service computers 1110 may be in communication with the user device 1104 via the networks 1108, or via other network connections. The one or more composing service computers 1110 may include one or more servers, perhaps arranged in a cluster or as individual servers not associated with one another.

In one illustrative configuration, the one or more composing service computers 1110 may include at least one memory 1118 and one or more processing units or processors(s) 1120. The processor(s) 1120 may be implemented as appropriate in hardware, computer-executable instructions, firmware, or combinations thereof. Computer-executable instruction or firmware implementations of the processor(s) 1120 may include computer-executable or machine-executable instructions written in any suitable programming language to perform the various functions described when executed by a hardware computing device, such as a processor. The memory 1118 may store program instructions that are loadable and executable on the processor(s) 1120, as well as data generated during the execution of these programs. Depending on the configuration and type of the one or more composing service computers 1110, the memory 1118 may be volatile (such as RAM) and/or non-volatile (such as ROM, flash memory, etc.). The one or more composing service computers 1110 or servers may also include additional storage 1122, which may include removable storage and/or non-removable storage. The additional storage 1122 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1118 may include multiple different types of memory, such as SRAM, DRAM, or ROM.

The memory 1118, the additional storage 1122, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1118 and the additional storage 1122 are all examples of non-transitory computer storage media. Additional types of non-transitory computer storage media that may be present in the one or more composing service computers 1110 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more composing service computers 110. Combinations of any of the above should also be included within the scope of non-transitory computer-readable media.

The one or more composing service computers 1110 may also contain communication connection interface(s) 1124 that allow the one or more composing service computers 1110 to communicate with a data store, another computing device or server, user terminals and/or other devices on the networks 1108. The one or more composing service computers 1110 may also include I/O device(s) 1126, such as a keyboard, a mouse, a pen, a voice input device, a touch input device, a display, speakers, a printer, etc.

Turning to the contents of the memory 1118 in more detail and as was described above in further detail in FIG. 8, the memory 1118 may include an operating system 1128, one or more data stores 1130, and/or one or more application programs or services for implementing the features disclosed herein including a content composing module 1132 (which may be an example of content composing module 800). In accordance with at least one embodiment, the content composing module 1132 may be configured to provide content such as web pages, receive user feedback in the form of API event handlers, API calls, UI element interactions, or application interactions, to determine a desired detail level that corresponds to network connectivity information of a user device of a user, and modify or re-compose content for providing to the user that reflects the desired detail level thus providing an enhanced viewing/interacting experience for the user that reflects the user's current network capabilities.

Figure 12:
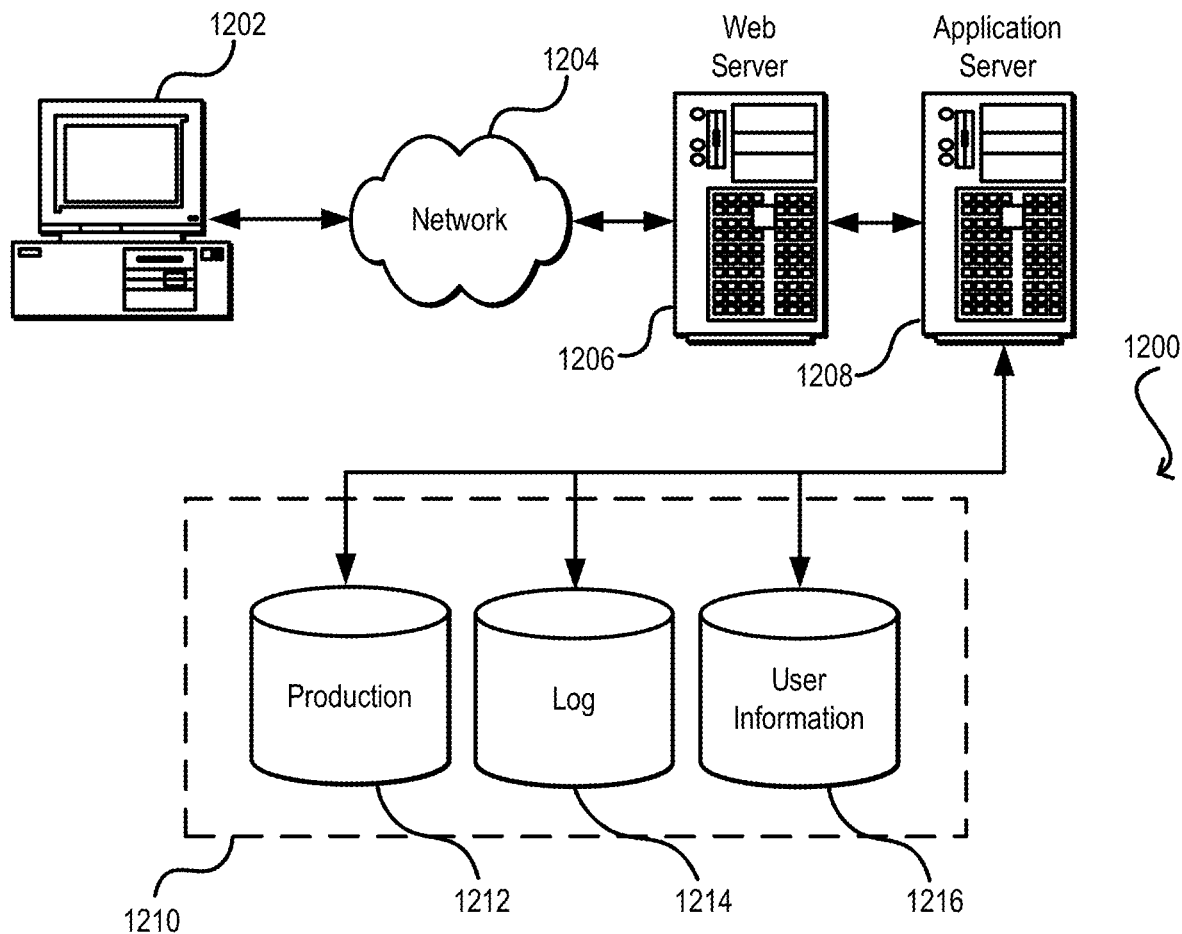
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    maintaining, by a computer system, information that indicates critical and non-critical elements for a web page, the critical elements for the web page comprising at least an element that is required for the web page to function according to an intended purpose associated with a type of the web page;
    receiving, from a mobile computing device, a request for content including a particular web page;
    providing the particular web page to the mobile computing device in response to the request;
    receiving, from the mobile computing device, input that indicates a detail level requested for the particular web page based at least in part on a level of network connectivity of the mobile computing device, the input obtained via interaction with a data object presented via the particular web page that represents a desired detail level for the particular web page, the data object configured to periodically change to a different detail level for the particular web page at periodic intervals based at least in part on a change in the network connectivity, the change in the network connectivity corresponding to periodic network ping operations that identify the change in the network connectivity of the mobile computing device;

maintaining, by the computer system, a history of desired detail levels for a type of the content associated with previous inputs provided via the mobile computing device, the type of the content including one or more media types, and the type of the content associated with the one or more media types for the critical and non-critical elements for previously interacted with web pages that correspond to the previous inputs;

composing, by the computer system, the particular web page based at least in part on the information, the history of desired detail levels for the type of the content, and the input, a composed particular web page configured to be presented according to the level of network connectivity of the mobile computing device that is different from the particular web page previously provided;

providing the composed particular web page to the mobile computing device; and updating, by the computer system, the data object to identify the desired detail level.

2. The computer-implemented method of claim 1, wherein receiving the input includes a user interacting with a physical component of the mobile computing device to indicate the detail level requested for the particular web page.

3. The computer-implemented method of claim 1, wherein receiving the input includes a user selecting a user mode that indicates the detail level requested for the particular web page.

4. The computer-implemented method of claim 1, wherein composing the particular web page is further based at least in part on an indication that providing the particular web page to the mobile computing device has exceed a particular time threshold.

5. The computer-implemented method of claim 1, further comprising providing a notification that indicates the detail level requested by the user, the notification enabling the user to authorize the composing of the particular web page at the detail level.

6. A system comprising:
a processor; and
a memory including instructions that, when executed with the processor, cause the system to, at least:
receive a request for content from a computing device;
provide the content to the computing device;
receive an indication of a desired detail level for the content, the indication received via input associated with an interaction with a data object of an application associated with the computing device, the data object being a graphical representation of the desired detail level for the content and configured to dynamically update to a different detail level for the content at periodic intervals based at least in part on a change in network connectivity, the change in the network connectivity corresponding to periodic network ping operations that identify the change in the network connectivity of the computing device;

maintain a history of desired detail levels for a type of the content associated with previous inputs provided via the computing device, the type of the content including one or more media types, and the type of the content associated with the one or more media types for the content that was previously interacted with and that corresponds to the previous inputs;

modify the content based at least in part on the indication and the history of desired detail levels; and provide a modified content to the computing device in accordance with the desired detail level.

7. The system of claim 6, wherein the instructions, when executed with the processor, further cause the system to maintain information that identifies the desired detail level for the content based at least in part on the input received from the application.

8. The system of claim 6, wherein the instructions, when executed with the processor, further cause the system to maintain information that indicates critical or non-critical elements for content pieces.

9. The system of claim 8, wherein the information may be specified by users and indicate preferences for the one or more media types associated with the content pieces.

10. The system of claim 8, wherein the information may be specified by authors of the content pieces.

11. The system of claim 6, wherein the instructions, when executed with the processor, further cause the system to provide a reminder to the computing device notifying a user of the computing device of a current desired detail level, the reminder configured to enable the user to update the desired detail level for the content and provided in response to the change in network connectivity.

12. A non-transitory computer readable medium storing specific computer-executable instructions that, when executed by a processor, cause a computer system to at least:
receive, from a mobile computing device, a request for content, the request including input associated with an interaction with a data object of an application associated with the computing device that indicates a desired detail level for the content and is configured to dynamically update to a different detail level for the content at periodic intervals based at least in part on a change in network connectivity, the change in the network connectivity corresponding to periodic network ping operations that identify the change in the network connectivity of the mobile computing device;

maintain a history of desired detail levels for a type of the content associated with previous inputs provided via the mobile computing device, the type of the content including one or more media types, and the type of the content associated with the one or more media types for the content that was previously interacted with and that corresponds to the previous inputs;

provide the content to the mobile computing device based at least in part on the request;

identify the change in network connection quality of the mobile computing device;

re-compose the content based at least in part on the change in the network connection quality and the history of desired detail levels for the type of the content; and provide a re-composed content to the mobile computing device which includes an updated data object to represent the updated detail level for the content and a notification indicating the updated detail level for the content.

13. The computer readable medium of claim 12, wherein the notification is configured to enable a user of the mobile computing device to authorize the updated detail level for the content.

14. The computer readable medium of claim 12, wherein the notification is configured to be provided for presentation via an application associated with the mobile computing device or as a user interface element associated with the content.

15. The computer readable medium of claim 12, wherein the change in the network connection quality for the mobile computing device is identified based at least in part on network quality tests conducted by an application associated with the mobile computing device.

16. The computer readable medium of claim 12, wherein the input that indicates the desired detail level for the content includes a selection of a data usage plan mode by a user of the mobile computing device.

17. The computer readable medium of claim 12, wherein the instructions, when executed with the processor, further cause the system to utilize the history of desired detail levels for the type of content on behalf of a user of the mobile computing device to determine an updated desired detail level for subsequent requests for the type of content.

\* \* \* \* \*